United States Patent [19]

Arima

[11] 4,246,635
[45] Jan. 20, 1981

[54] POWER-SUPPLY DEVICE WHICH BOOSTS AND STABILIZES THE VOLTAGE

[75] Inventor: Takeo Arima, Tokyo, Japan
[73] Assignee: Hochiki Corporation, Tokyo, Japan
[21] Appl. No.: 950,622
[22] Filed: Oct. 12, 1978
[30] Foreign Application Priority Data
Oct. 14, 1977 [JP] Japan .............................. 52-138381[U]
[51] Int. Cl.³ .............................................. H02M 3/18
[52] U.S. Cl. ...................................... 363/101; 363/61
[58] Field of Search ..................... 363/59–61, 363/74, 78–79, 101, 25–26, 55–56

[56] References Cited

U.S. PATENT DOCUMENTS

| | | | |
|---|---|---|---|
| 3,573,595 | 4/1971 | Galluppi | 363/59 X |
| 3,656,052 | 4/1972 | Genuit et al. | 363/101 X |
| 3,671,845 | 6/1972 | Guggi | 363/101 |
| 3,784,893 | 1/1974 | Rando | 363/56 X |
| 4,054,827 | 10/1977 | Reimers | 363/101 X |
| 4,092,712 | 5/1978 | Harrigill, Jr. et al. | 363/101 X |

Primary Examiner—William M. Shoop
Assistant Examiner—Peter S. Wong
Attorney, Agent, or Firm—Wenderoth, Lind & Ponack

[57] ABSTRACT

A power supply device which boosts and stabilizes the voltage of a dc power supply includes an oscillator circuit connected to the dc power supply, a voltage multiplying rectifier circuit which rectifies the output of the oscillator circuit and boosts the voltage and an oscillator control circuit which monitors the boosted voltage and stabilizes the boosted voltage by on-off control of the oscillator circuit. The voltage multiplying rectifier circuit includes a voltage storage element, such as a capacitor connected in parallel with the load driven by the power-supply device. When the output voltage of the device exceeds a predetermined reference voltage, the oscillator control circuit turns the oscillator circuit off. The voltage storage element is thus no longer supplied with electric energy and begins to discharge through the load thereby lowering the output voltage of the device. When the ouput voltage falls below the predetermined reference voltage the oscillator control circuit turns the oscillator circuit on again to repeat the voltage stabilization cycle.

2 Claims, 1 Drawing Figure

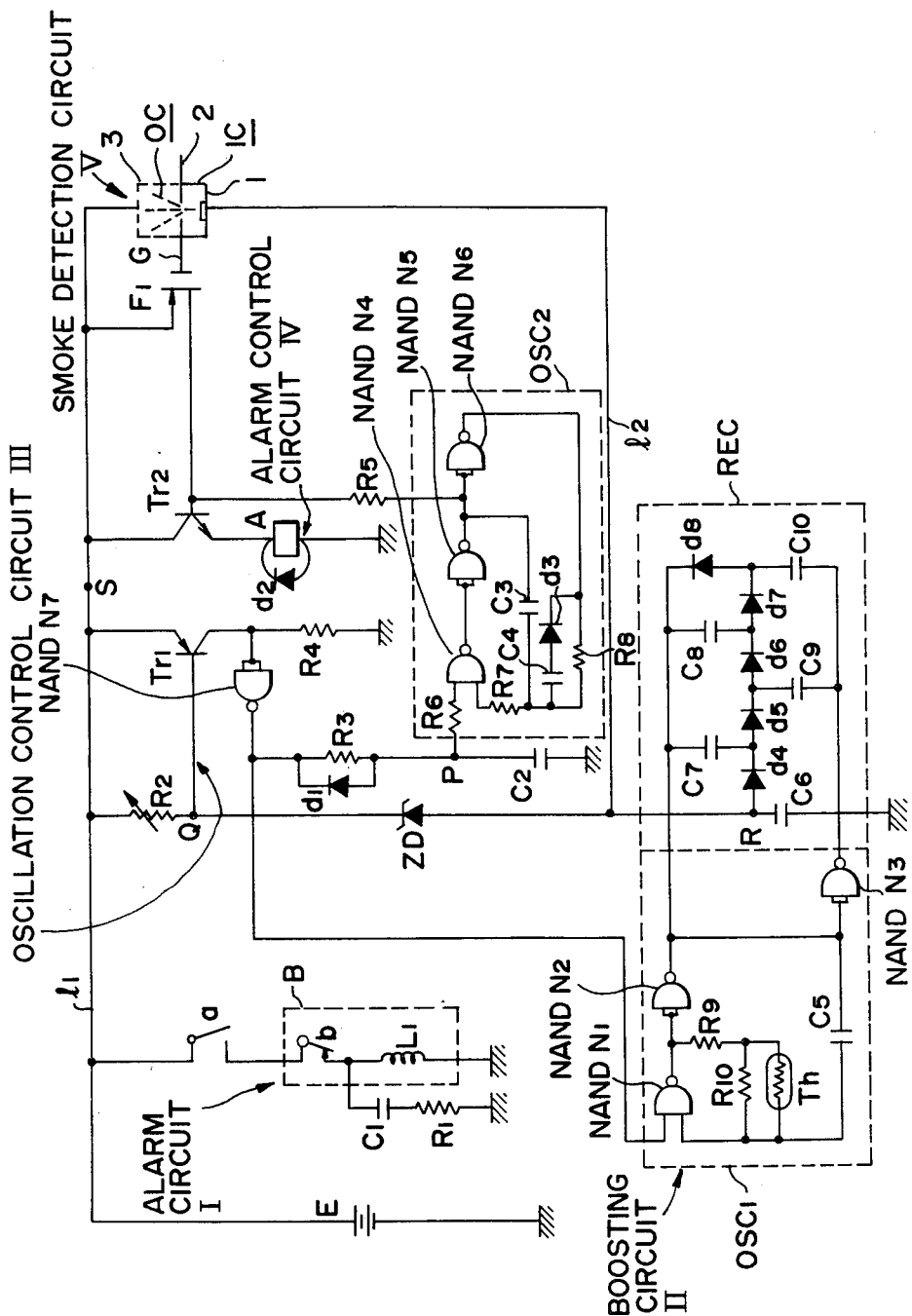

POWER-SUPPLY DEVICE WHICH BOOSTS AND STABILIZES THE VOLTAGE

BACKGROUND OF THE INVENTION

Field of the Invention:

The present invention relates to a power-supply device which boosts and stabilizes a dc voltage, and particularly to a power-supply device which boosts and stabilizes the voltage employed in an ionization-type smoke sensor that operates on ordinary dry batteries.

Prior Art:

In order to operate devices that require a high voltage by means of low-voltage dc power supply such as dry batteries having a limited power capacity, the inventors of the present invention have previously proposed a method for boosting the power-supply voltage so that the devices can be operated with the boosted voltage. A voltage stabilizer device is employed in the method of this proposal which works to stabilize the supply voltage at a constant level. The voltage of the battery is boosted above a predetermined value, and the excess of the boosted voltage over the predetermined value is dissipated by the stabilizer device to lower the output voltage to the predetermined voltage. Therefore, the consumption of power is increased by this dissipation causing the life of the power supply to be shortened.

SUMMARY OF THE INVENTION

According to the present invention which avoids the above-mentioned defect, the boosted voltage is monitored. When the output voltage exceeds a predetermined value, the boosting operation is temporarily stopped. When the output voltage falls below the predetermined voltage due to electrical discharge, the boosting operation is resumed to produce the predetermined voltage, so that the voltage is stably boosted while a reduced amount of electric power is consumed. Such a power-supply device which boosts and stabilizes the voltage can be effectively utilized in battery-powered ionization-type smoke sensors that are designed to stably operate on the boosted voltage from dry batteries having small power capacities.

It is therefore an object of the present invention to provide a power-supply device which boosts and stabilizes the voltage, having an oscillator circuit powered by a dc power supply, a booster circuit which rectifies and boosts the oscillating output of the oscillator circuit, a resistor element having a resistance value sufficient to maintain a great voltage differential thereacross connected between a power-supply terminal (or a load terminal) of the dc power supply and an output terminal of the booster circuit, and a switching element which monitors the changes in the voltage differential and thereby effectively controls the electric current supplied to the oscillator circuit.

BRIEF DESCRIPTION OF THE DRAWING

The accompanying drawing is a circuit diagram showing a power-supply circuit according to the present invention.

PREFERRED EMBODIMENTS OF THE INVENTION

The invention is described in detail below with reference to an embodiment shown in the accompanying drawing.

The drawing is a circuit diagram of an ionization-type smoke sensor employing the device which boosts and stabilizes the voltage of the present invention. The symbol E represents a power supply consisting of 1 or 2 1.5-volt dry batteries, and symbol $l_1$ denotes a conductor connected to the cathode of the power supply E. The anode of the power supply is grounded. An alarm device I, a booster circuit II, an oscillation control circuit III, an alarm energizer circuit IV, and a smoke detector unit V are connected between the conductor $l_1$ and ground. In accordance with the usual practice in such circuit diagrams, the drawing does not illustrate the power supply connections to the NAND circuits $N_1$ to $N_7$ but it is understood that these NAND circuits are supplied with power from power supply E. Thus, although the drawing does not show the connection between the booster circuit II and the conductor $l_1$, note that NAND circuits $N_1$, $N_2$, and $N_3$ contained in the booster circuit II are all connected to the conductor $l_1$ and supplied with electric power from the power supply E. A point S on the conductor $l_1$ is used as a power-supply terminal of the power supply or as a load terminal.

The power-supply device which boosts and stabilizes the voltage according to the present invention consists of the booster circuit II and the oscillation control circuit III.

Referring to the alarm device I, a relay contact a, and a buzzer consisting of a breaker contact b and a coil $L_1$ surrounded by a dotted line B are connected between the conductor $l_1$ and ground. Further, a spark extinguisher circuit consisting of a capacitor $C_1$ and a resistor $R_1$ is connected between the junction of contact b and coil $L_1$ and the ground.

Referring to the smoke detector unit V, an outer electrode 3 of an outer ionization chamber OC is connected to the conductor $l_1$. An inner electrode 1 of an inner ionization chamber IC is connected to an output terminal R of the booster circuit via a conductor $l_2$. The output terminal R is connected to the conductor $l_1$ via a zener diode ZC having the polarity shown and a resistor $R_2$. An intermediate electrode 2 is connected to the gate of a field effect transistor $F_1$ which performs a switching operation. The source of field effect transistor $F_1$ is connected to the conductor $l_1$, and the drain thereof is connected to the base of a transistor $Tr_2$ of the alarm energizer circuit IV.

Referring to the alarm energizer circuit IV, the collector of the transistor $Tr_2$ is connected to the conductor $L_1$, a relay A is connected between the emitter and the ground, and a diode $d_2$ is connected in parallel with relay A for absorbing any excess voltage.

Referring to the oscillation control circuit III, a transistor $Tr_1$ and a resistor $R_4$ are connected in series between the conductor $l_1$ and ground. The base of the transistor $Tr_1$ is connected to the junction Q where the resistor $R_2$ and the zener diode ZD are connected in series. The resistor $R_2$ is variable, and it is provided to adjust the difference in voltage to render the zener diode ZD conductive. The collector of the transistor $Tr_1$ is connected to both input terminals of a NAND circuit $N_7$ and to ground through resistor $R_4$. Further, a series circuit consisting of the parallel connection of a resistor $R_3$ and a diode $d_1$, and a capacitor $C_2$ are connected between the output terminal of the NAND circuit $N_7$ and ground. An oscillator circuit $OSC_2$ surrounded by a dotted line is connected to the base of the transistor $Tr_2$ via a resistor $R_5$ and to a junction P where the resistor $R_3$ and the capacitor $C_2$ are connected in series.

The oscillator circuit $OSC_2$ consists of NAND circuits $N_4$ to $N_6$, resistor $R_6$ to $R_8$, capacitors $C_3$ and $C_4$, and a diode $d_3$. One input terminal of the NAND circuit $N_4$ is connected to the junction P, the input terminal of the oscillator circuit $OSC_2$, via the resistor $R_6$. The output terminal of the NAND circuit $N_5$, which is connected to the output terminal of the NAND circuit $N_4$, i.e. the output terminal of the oscillator circuit $OSC_2$, is connected to the base of the transistor $Tr_2$ via the resistor $R_5$. A resistor $R_7$ and a capacitor $C_3$ are connected between the other input terminal of the NAND circuit $N_4$ and the output terminal of the NAND circuit $N_5$. Both input terminals of the NAND circuit $N_6$ are connected to the output terminal of the NAND circuit $N_5$. A resistor $R_8$ is connected between the junction where the resistor $R_7$ and the capacitor $C_3$ are connected in series and the output terminal of the NAND circuit $N_6$. Further, a series circuit consisting of a capacitor $C_4$ and a diode $d_3$ is connected in parallel with the resistor $R_8$.

When a L (low) level voltage is applied to the NAND circuit $N_4$ via the resistor $R_6$, the oscillator circuit $OSC_2$ produces an output which is always a H (high) level; therefore, the oscillator $OSC_2$ is stabilized and does not oscillate. At that time, the output of the NAND circuit $N_5$ is a L level, so that the transistor $Tr_2$ is not rendered conductive, and the relay A is not energized. When the input to the NAND circuit $N_4$ is changed from a L level into a H level, the oscillator circuit acquires a contradictory state and starts to oscillate, so that outputs of a H level and a L level are alternatingly produced from the NAND circuit $N_5$. Therefore, the transistor $Tr_2$ is turned on, off, on, off, . . . repetitively, whereby the relay A is intermittently energized causing the buzzer B to intermittently produce an alarm sound.

The booster circuit II consisting of an oscillator circuit $OSC_1$ and a voltage multiplying rectifier REC is connected to the output terminal of the NAND circuit $N_7$ and to the junction R where the zener diode ZD and the capacitor $C_6$ are connected in series. The oscillator circuit $OSC_1$ consists of NAND circuits $N_1$ to $N_3$ which are connected in series as shown, whereby one input terminal of the NAND circuit $N_1$, i.e. the input terminal of the oscillator circuit $OSC_1$, is connected to the output terminal of the NAND circuit $N_7$. A series circuit consisting of the parallel connection of a resistor $R_{10}$ and a temperature-compensating thermistor Th and a resistor $R_9$ are connected between the other input terminal and the output terminal of the NAND circuit $N_1$. A capacitor $C_5$ is connected between the other input terminal of the NAND circuit $N_1$ and an input terminal of the NAND circuit $N_3$. When a H level input is applied to the input terminal of the NAND circuit $N_1$, the oscillator circuit $OSC_1$ starts to oscillate whereby voltages alternatingly changing between a L level and a H level are produced by the output terminals of the NAND circuits $N_2$ and $N_3$. These voltages are rectified by the voltage multiplying rectifier REC (multiplied by four times according to this embodiment) compound of diodes $d_4$ to $d_8$ and capacitors $C_6$ to $C_{10}$ as shown, and converted into a high negative potential which appears at the output terminal R. When a L level voltage is applied to the input terminal of the NAND circuit $N_1$, the oscillator circuit $OSC_1$ does not oscillate and does not boost the voltage.

The operation of the booster circuit II is described below. When the power supply is connected under ordinary conditions, a H level is applied to the NAND circuit $N_1$ causing the oscillator circuit $OSC_1$ to oscillate. The oscillating output is rectified and boosted through the voltage multiplying rectifier REC to produce a high negative potential at the output terminal R. The high negative potential is then applied to the inner electrode 1 of the smoke detector unit V to properly operate it. Therefore, if no smoke flows into smoke detector unit V, the field effect transistor $F_1$ remains turned off, and the transistor $Tr_2$ turned off; the relay A is not energized and an alarm is not produced. When a negative potential greater that the predetermined value is produced as a result of the oscillation and voltage multiplying rectification of the booster circuit II, the zener diode ZD is turned on, and the potential at the junction Q becomes more negative causing the transistor $Tr_1$ to be turned on. Therefore, an H level voltage is applied to the NAND circuit $N_7$ which produces a L level voltage. As a result, the oscillator $OSC_1$ stops oscillation, and the voltage multiplying rectifier REC no longer boosts the voltage. The electric charge accumulated in the capacitor $C_6$ while the voltage was being boosted is gradually discharged through the smoke detector unit V. During this period, the predetermined voltage is fed to the smoke detector unit. As the discharge continues, the potential at the output terminal R decreases below a predetermined value. When the potential at the output terminal R is decreased below the predetermined value, the zener diode ZD is rendered non-conductive, whereby the potential at the junction Q becomes more positive causing the transistor $Tr_1$ to be turnd off. Consequently, a L level input is fed to the NAND circuit $N_7$, and a H level input is fed to the input terminal of the NAND circuit $N_1$. As a result, the oscillator circuit $OSC_1$ resumes oscillation, and the voltage multiplying rectifier REC starts to boost the voltage, where upon the potential at the output terminal R is raised to the predetermined value.

As the potential exceeds the predetermined value again, the zener diode ZD is turned on, causing the transistor $Tr_1$ to be turned on; the oscillation of the oscillator circuit $OSC_1$ is stopped, and the accumulated voltage is discharged. The aforementioned operations are repeated thereby maintaining the potential at the output terminal R, i.e. maintaining the boosted output voltage at the predetermined value. Here, when the potential at the output terminal R is decreased below a predetermined value, the NAND circuit $N_7$ produces an H level output which electrically charges the capacitor $C_2$, eventually, causing the oscillator circuit $OSC_2$ to oscillate. If the voltage of the power supply E is greater than the predetermined value, the booster circuit II is operated so as to maintain the potential at the output terminal R above the predetermined value, and to maintain the output of the NAND circuit $N_7$ at the L level. The capacitor $C_2$, accordingly, is discharged and does not provide an H level input to the input terminal of the NAND circuit $N_4$.

When the boosted voltage of the voltage multiplying rectifier REC or, in other words, when the potential at the output terminal R fails to reach a high potential of the negative polarity due to the depleted power capacity of the battery, the zener diode ZD remains turned off, whereby the potential at the junction Q becomes more positive. The transistor $Tr_1$ is therefore turned off and the output of the NAND circuit $N_7$ stays in the H level. The oscillator circuit $OSC_1$ therefore continues to oscillate (the potential at the output terminal R, however, does not exceed the predetermined value even if it is boosted by the voltage multiplying rectifier REC since the power capacity of the battery has been depleted), while the capacitor $C_2$ is electrically charged by the H level output of the NAND circuit $N_7$. The H level voltage therefore is fed to the NAND circuit $N_4$, causing the oscillator circuit $OSC_2$ to oscillate. Consequently, the transistor $Tr_2$ is turned on and off repetitively to intermittently energize the relay A. Therefore, the buzzer B is intermittently energized to produce an intermittent alarm sound to indicate the depletion of the battery.

When smoke is detected, the potential of the intermediate electrode 2 is lowered as is well known whereby the field effect transistor $F_1$ is rendered conductive and the transistor $Tr_2$ is also rendered conductive, causing the relay A to be continuously energized. The contact a is closed to actuate the buzzer B.

According to the present invention described in detail in the foregoing, the boosted voltage is always monitored. When the boosted voltage exceeds the predetermined voltage, the boosting operation is stopped and the accumulated electric energy is allowed to discharge. When the boosted voltage is decreased below the predetermined voltage, the boosting operation is resumed to raise the voltage up to the predetermined voltage. It therefore stabilizes the boosted voltage while consuming less electric power than conventional system thereby lengthening the life expectancy of the dry batteries. Although the function of the oscillator circuit $OSC_1$ in this embodiment was stopped and started repetitively to stabilize the boosted output, it is also possible to stabilize the boosted output by varying the oscillating period of the oscillator circuit.

What is claimed is:

1. A power-supply device for providing a boosted and stabilized dc voltage from a dc power source comprising:

an oscillator circuit for energization by the dc power source for producing an oscillation signal;

a voltage multiplying rectifier circuit including an electric energy storage means for storing electric energy therein having a voltage proportional to said electric energy and connected to said oscillator circuit for rectifying said oscillation signal, for multiplying the voltage of said oscillation signal for producing a multiplied voltage dc signal, and for storing said multiplied voltage dc signal in said electric energy storage means, said voltage proportional to said electric energy stored in said electric energy storage means being said boosted and stabilized dc voltage; and an oscillator control circuit connected to said oscillator circuit and to said voltage multiplying rectifier circuit for inhibiting said production of said oscillation signal by said oscillator circuit when said voltage of said electric energy storage means exceeds a predetermined voltage, whereby when said oscillator circuit is inhibited said electric energy stored in said electric energy storage means is discharged until said voltage of said electric energy storage means decreases to said predetermined voltage whereupon said oscillator control circuit no longer inhibits said oscillator circuit.

2. A power-supply device for producing a boosted and stabilized dc voltage comprising:

a load terminal;

a booster terminal;

a dc power-supply having a first terminal connected to said load terminal and a second terminal connected to ground;

an oscillator circuit having a control input terminal and an output terminal for generating an oscillation signal on said output terminal when a low level signal is applied to said control input terminal;

a voltage multiplying rectifier circuit having an input terminal connected to said output terminal of said oscillator circuit, an output terminal connected to said booster terminal and including an electric energy storage means having a first terminal connected to said output terminal of said voltage multiplying rectifier circuit and a second terminal connected to ground for storing electric energy, said voltage multiplying rectifier circuit being for rectifying said oscillation signal, for multiplying the voltage of said oscillation signal for producing a multiplied voltage dc signal, and for storing said multiplied voltage dc signal in said electric energy storage means, said boosted and stabilized dc voltage appearing between said load terminal and said booster terminal;

a voltage detector circuit having a first terminal connected to said load terminal and a second terminal connected to said booster terminal for producing an inhibit signal when the voltage between said load terminal and said booster terminal exceeds a predetermined voltage; and an oscillation control circuit having an input terminal connected to said voltage detector circuit and an output terminal connected to said control input terminal of said oscillation circuit for applying a low level signal to said control input terminal of said oscillator circuit when said voltage detector circuit is not producing said inhibit signal and for applying a high level signal to said control input terminal of said oscillator circuit when said voltage detector circuit is producing said inhibit signal, whereby when said oscillator circuit is not generating said oscillation signal said electric energy stored in said electric energy storage means is discharged until said voltage between said load terminal and said booster terminal decreases to said predetermined voltage whereupon said oscillation control circuit applies a low level signal to said control input of said oscillator circuit.

* * * * *